Jan. 23, 1968  R. E. GELLER  3,364,785
STEERING WHEEL HUB MEANS
Filed Sept. 2, 1965  2 Sheets-Sheet 2

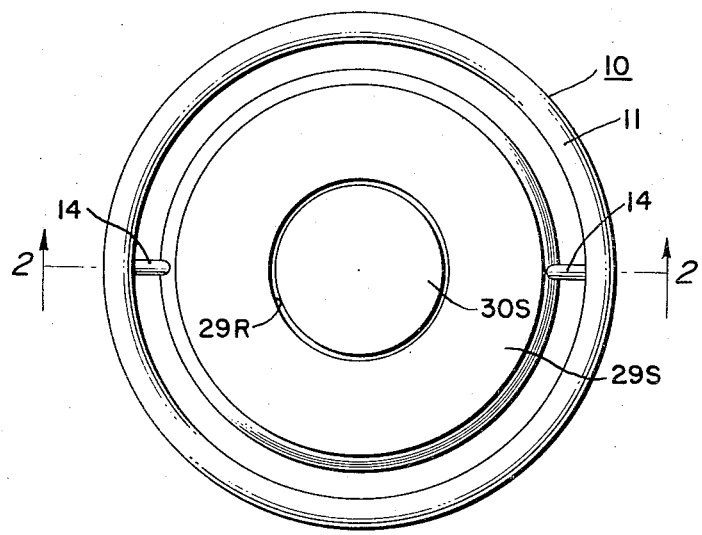
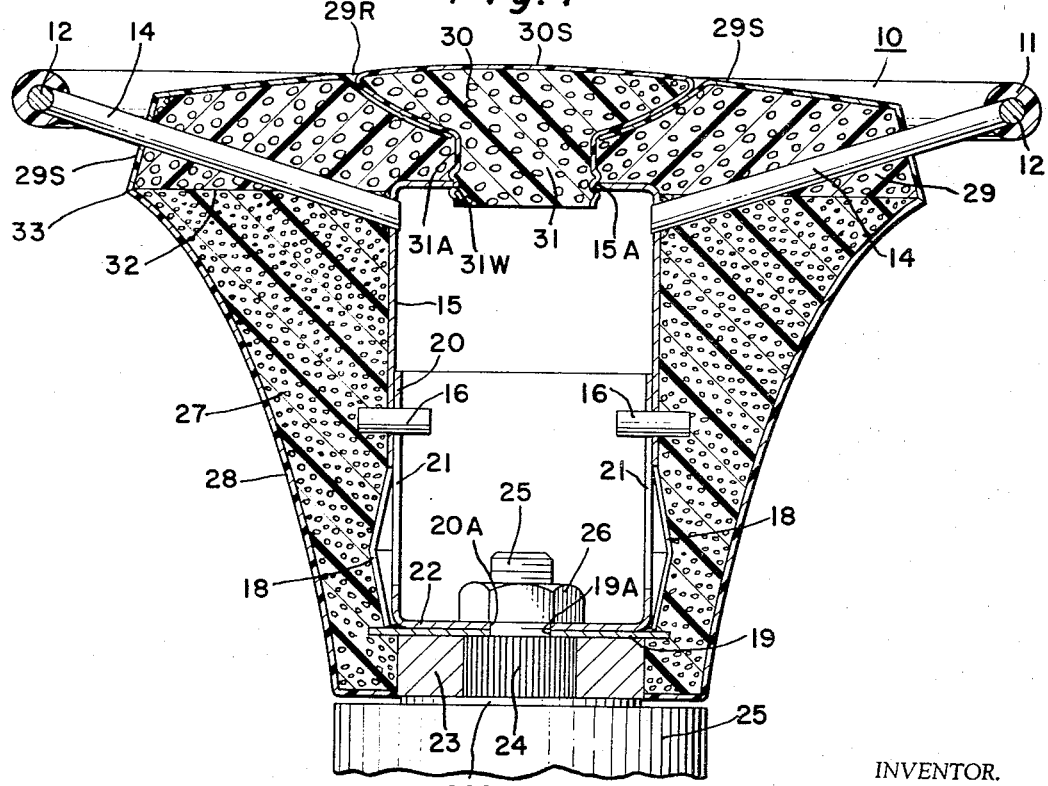

INVENTOR.
Rodger E. Geller
BY
Albert H. Reuther
His Attorney

United States Patent Office 3,364,785
Patented Jan. 23, 1968

3,364,785
STEERING WHEEL HUB MEANS
Rodger E. Geller, Dayton, Ohio, assignor to General Motors Corporation, Detroit, Mich., a corporation of Delaware
Filed Sept. 2, 1965, Ser. No. 484,517
1 Claim. (Cl. 74—552)

ABSTRACT OF THE DISCLOSURE

A steering wheel having the ends of the spokes thereof remote from the rim securely attached to one end of the first of two telescoping cylindrical members. A pair of drive pins securely attached to and extending in a direction substantially normal to the axis of the first cylindrical member engages corresponding slots in the second cylindrical member. The cylindrical members and portions of the spokes are surrounded by a relatively dense skin foam material extending in a truncated conical configuration.

---

This invention relates to steering wheel hub means, and more particularly, to the structure thereof.

Trends presently are toward increased use of plastic materials for vehicle appointments so far as interior trim and structural features are concerned.

It is an object of this invention to provide a steering wheel hub structure including a pair of substantially cylindrical members complementary to each other for telescopic interfit within limits of slit and pin connection therebetween and covered with a plastic material extending in a truncated conical configuration.

Further objects and advantages will become apparent from the following description, reference being had to the accompanying drawings wherein preferred embodiments of the present invention are clearly shown.

In the drawings:

FIGURE 1 is a plan view of steering wheel means having hub structure with features in accordance with the present invention.

FIGURE 2 is a cross sectioned elevational view taken diagonally through structure of FIGURE 1.

Figure 3:
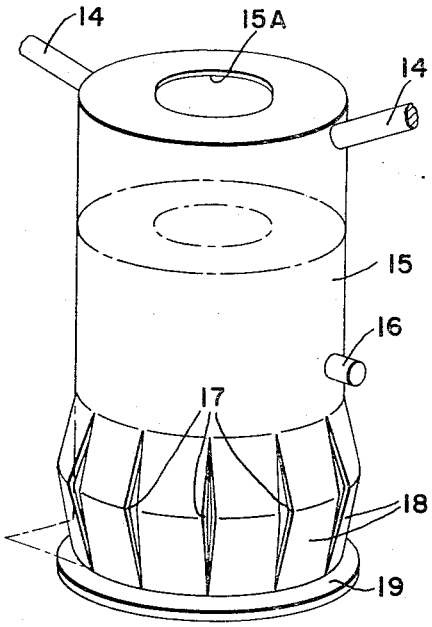
FIGURE 3 is a perspective view of some structure of FIGURE 2.

In FIGURE 1 there is shown a steering wheel means generally indicated by numeral 10 having a rim portion 11. The rim portion 11 as shown in FIGURE 2 includes an annular reinforcing means 12 to which radially inwardly extending spokes 14 are secured by welding or brazing. The spokes 14 are angularly offset from a reference plane through the annular reinforcement portion 12. Extent of this angular offset is for a dish or cup-like recessing up to substantially three inches in depth axially from the reference plane. Inner ends of the spokes 14 are suitably secured such as by welding or brazing to an outer telescopic cylindrical member 15 carrying at least a pair of opposite radially extending pins 16 in laterally opposite though central locations. These pins 16 are also suitably secured to the member 15 by welding, brazing and the like. The member 15 further includes a plurality of slits 17 located between V-shaped segments or resilient metal finger portions 18. A lower end of the finger portions 18 has structural connection such as by welding or brazing to an annular plate 19 extending as a flange radially outwardly at least as far as collective outer diameter of each apex of V-shaped segments 18. The plate or flange portion 19 has a central opening or aperture 19A located axially in alignment with an opening or aperture 15A of the cylindrical member 15.

A second or inner cylindrical member 20 has a corresponding opening or aperture 20A. The second cylindrical member 20 also has a pair of longitudinally or axially extending slots or slits 21 located diametrically opposite to each other and complementary to the radially inwardly extending pins 16. The second cylindrical member 20 has a radially inwardly extending flange or end portion 22 which abuts against one side of the flange or plate portion 19 as shown in FIGURE 2. This flange or plate portion 19 and the radially inwardly extending portion 22 fits axially against a spacer or annular ring means 23. The ring means 23 is splined or mated onto a steering column shaft 24 having a threaded end 25 to which a bolt or nut 26 is secured in a well known manner. A steering column housing 25 and an intermediate shroud portion 26S have axial positioning to one side of the steering wheel hub means. The housing and shroud are complementary to a first foam portion 27 having a skin 28. A further or secondary foam portion 29 with a skin covering 29S is added to an enlarged end of the first foam portion 27. The first foam portion 27 is preferably made of a relatively dense material or plastisol foamed directly in combination with the telescoping members 15 and 20 and surrounding the V-shaped segments or resilient fingers 18. The pins 16 interfit with the slots 21 at all times so that a proper turning or steering movement can be conveyed by a vehicle operator from the steering wheel rim portion 11 through the spokes 14 to the telescoping cylindrical members secured to the steering column.

In FIGURE 2, the secondary foam portion 29 is shown to be made of a relatively more soft material surrounding the spokes 14 in a manner supplementary to encapsulation of the spokes and cylindrical members. The secondary foam portion 29 with the skin 29S thereof extends laterally across a central steering wheel end zone as represented in FIGURES 1 and 2. Preferably the upper surfacing of the secondary foam portion 29 and skin 29S thereof remains within one half inch of a reference plane through the annular reinforcing rim 12. A central cap portion 30 having a skin covering 30S is fitted into a recessing 29R of the second foam portion. The cap portion includes a reduced diameter end 31 having a wavy or W-shaped periphery 31W which mates telescopically with inner edging of the aperture 15A of the cylindrical member 15. It is to be understood that the cap portion 30 is shown with foam material filling though a hollow plastic cap portion of similar configuration is also possible for fitting complementary to the secondary foam portion 29. The cylindrical axial portion 31A of the cap 30 thus also has telescopic fit as to one of the cylindrical members 15. The resilient fingers 18 have V-shaped configuration as a start of bend already therein in a normal rest position. The drive pins 16 for steering are totally embedded in combination with foam material. It is noted that a suitable adhesive such as epoxy resin is applied along a split 32 between the upper and lower foam portions 29 and 27 respectively. Similar adhesive is provided for juncture of the skin covering along a radially outer edging 33. The coverings are made of plastic sheet material such as vinyl having a simulated leather appearance. Decorative coloring of the coverings and cap portion match the interior trim of the vehicle as well as coloring of the rim portion 11.

FIGURE 3 shows the cylindrical member 15 including the slits and resilient segments or fingers 18 as well as the flange or plate portion 19 in perspective.

Figure 4:
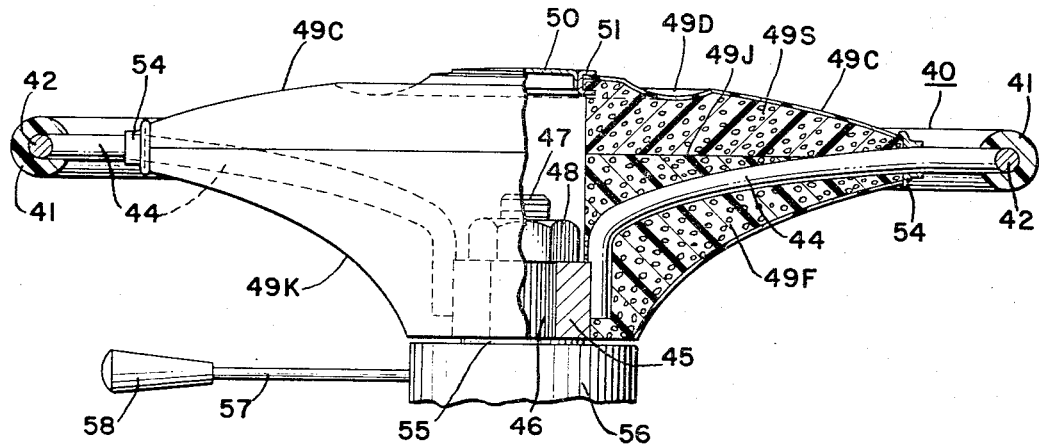
FIGURE 4 is a partially sectioned elevational view of further steering wheel hub means having features in accordance with the present invention.

FIGURE 4 shows a steering wheel means generally indicated by numeral 40 having a rim portion 41 with an annular reinforcement 42 as well as spoke portions 44.

The spoke portions 44 are suitably welded to the rim portion 42 and a radially inner end of the spokes 44 is secured by welding or brazing to an annular ring 45. The ring 45 is fitted complementary to a splined steering column 46 having a threaded end 47 to which a bolt or nut 48 is secured. A first foam portion 49F as well as a second foam portion 49S have complementary juncture 49J to each other adhesively maintained such as by epoxy resin. A skin portion 49K is provided directly on the first foam portion 49 and a vinyl skin covering 49C is provided on the secondary foam portion 49S. The first and second foam portions 49F and 49S respectively in the embodiment of FIGURE 4 are of the same rigidity or softness. The secondary foam portion and skin thereof in FIGURE 4 has a dip or annular depression 49D located concentrically around a plastic cap portion 50 secured to a ring portion 51 having a C-shaped cross section. This ring portion 51 is bonded to the cap portion 50 and is displaceable with the second foam portion 49S. The cap portions 30 and 50 provide access to the bolt or nut structure for securing the steering wheel means to the steering column. Also shown in FIGURE 4 is a ferrule means 54 surrounding each of the spokes 44 as a trim and seal as to the first and second foam portions 49F and 49S respectively. A shroud portion 55 as well as a steering column housing 56 are provided in a well known manner together with a directional signal light lever 57 having a plastic knob end 58 in a well known manner. The foam pad portions in the embodiments illustrated are split to facilitate clearance and fit to opposite sides of the spokes. Cementing of the upper half and bottom portion of the foam portions assures adherence of the steering wheel hub means. Each of the lower foam portions 27 and 49F have a substantially truncated conical configuration.

While the embodiments of the present invention as herein disclosed constitute preferred forms, it is to be understood that other forms might be adopted.

What is claimed is as follows:

1. A steering wheel comprising a rim, spoke means securely attached to and extending radially inwardly from said rim, a first cylindrical member having axial slits forming resilient V-shape segments adjacent one end thereof and at least two drive pins securely secured thereto and extending in a direction substantially normal to the axis thereof, means for securely attaching said spoke means to the end of said first cylinder member opposite said axial slits, an annular plate member of a diameter larger than said first cylindrical member, means for securely attaching the periphery of the other end of said first cylinder member to said annular plate member, a second cylindrical member having elongated slots complementary to said drive pins and a radially inwardly extending flange at one end thereof slideably positioned within said first cylindrical member with said elongated slots engaging said drive pins and said flange adjacent said annular plate, a first foam portion having a generally truncated conical shape surrounding said first and second cylindrical members, a second foam portion located substantially concentrically of said rim and axially over said first foam portion and a central plastic cap portion telescopically fit centrally into said second foam portion.

References Cited
UNITED STATES PATENTS

| | | | |
|---|---|---|---|
| 2,166,290 | 7/1939 | Geyer | 74—552 |
| 2,872,539 | 2/1959 | Berner | 74—552 X |
| 3,016,764 | 1/1962 | Fredericks et al. | 74—552 |
| 3,167,974 | 2/1965 | Wilfert | 74—552 |
| 3,172,683 | 3/1965 | D'Antini | 74—552 X |
| 3,198,288 | 8/1965 | Presunka | 188—1 |
| 3,236,333 | 2/1966 | Mitchell | 188—1 |

MARTIN P. SCHWADRON, *Primary Examiner.*

FRED C. MATTERN, *Examiner.*

W. S. RATLIFF, *Assistant Examiner.*